Nov. 23, 1926.  
J. W. LOFTIN  
VALVE  
Filed April 9, 1925  
1,608,178

INVENTOR.
J. W. Loftin,
BY
ATTORNEYS.

Patented Nov. 23, 1926.

1,608,178

UNITED STATES PATENT OFFICE.

JOSEPH W. LOFTIN, OF DEPEW, OKLAHOMA.

VALVE.

Application filed April 9, 1925. Serial No. 21,902.

This invention relates to improvements in valves, and it consists of the constructions, combinations and arrangements herein described and claimed.

An object of the invention is to provide a valve to be used in connection with vapor top tanks, it being of such arrangement that closure of any particular tank may be made more effectively and at the same time avoid the pocket of fluid above the valve in a manner brought out below.

Another object of the invention is to provide a valve having a reversible seat.

Other objects and advantages appear in the following specification, reference being had to the accompanying drawings, in which—

Figure 2:
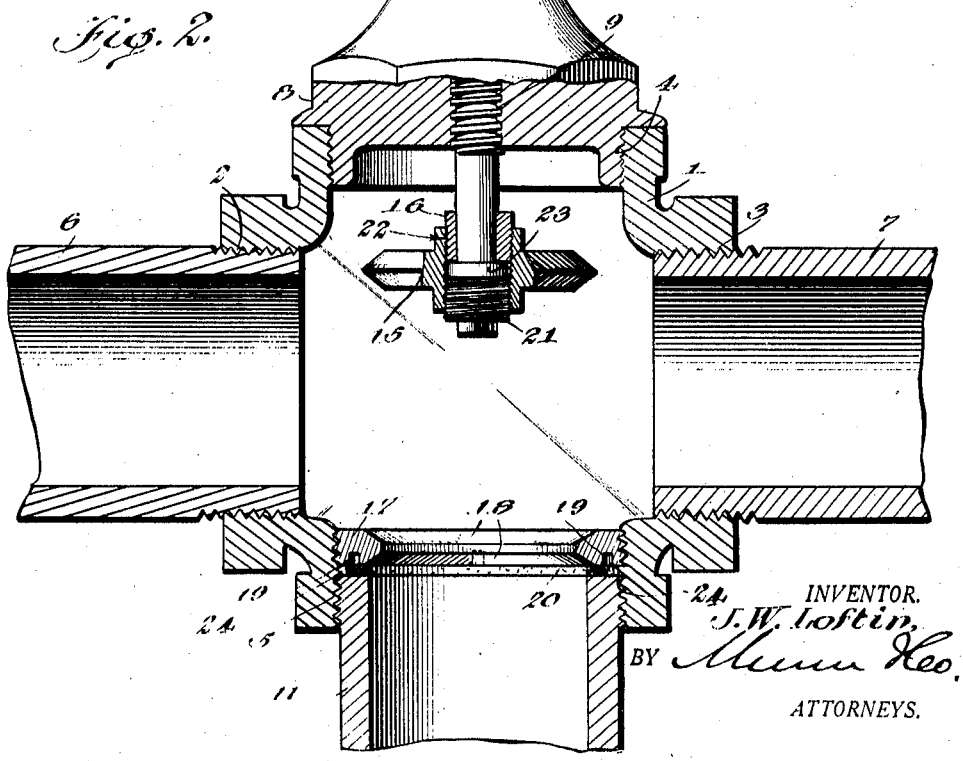
Figure 2 is a sectional view of the improved valve.

Upon reference to Figure 2 it is observed that the valve is composed of a body 1 which has four internally threaded openings 2, 3, 4 and 5 disposed at right angles or quarters in respect to each other. The openings 2 and 3 are in horizontal alignment, the openings 4 and 5 in vertical alignment.

Figure 1:
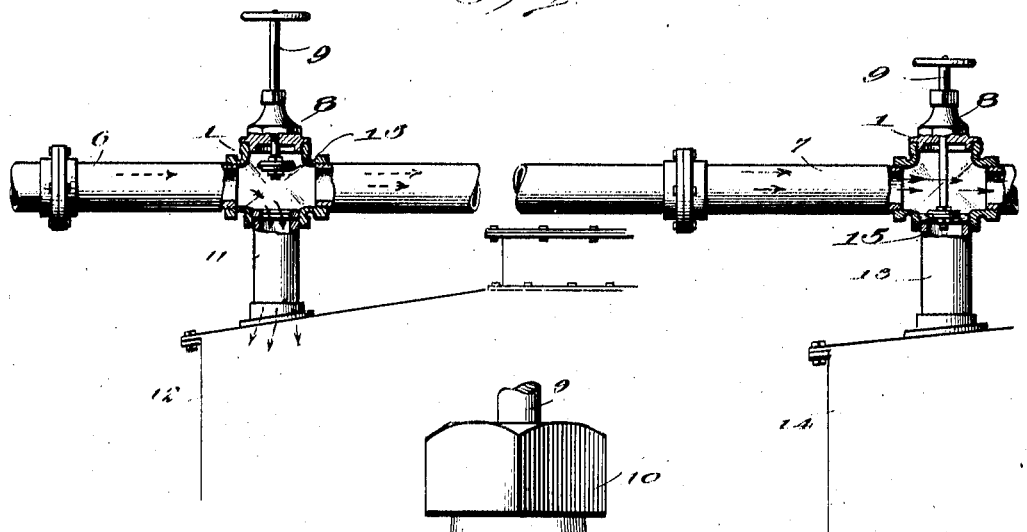
Figure 1 is an elevation, partly in section, illustrating the use of several of the improved valves in connection with as many tanks.

The members 6 and 7 of what may be regarded as a pipe line are screwed into the openings 2 and 3. The bonnet 8 screws into the opening 4. The threaded spindle 9 works up and down in the bonnet according to custom. A nut 10 compresses a packing and gland (not shown) around the spindle in the usual manner. A lateral pipe 11 screws into the opening 5, and has suitable connection with the top of a tank 12 (Fig. 1) intended to be filled. In Figure 1 the pipe line 6, 7 includes a second valve having a lateral outlet pipe 13 discharging into a second tank 14.

The spindle 9 carries a valve disk 15 which is beveled on opposite edges to permit use in either of its possible positions upon the spindle. It is held in place by a sleeve 16 and plug 21. The sleeve and plug are screwed into opposite ends of the threaded bore 22 of the valve disk until they bear against the circular head 23 loosely, making a swivel connection. Upon removal of the sleeve and plug the valve disk may be reversed in position upon the stem, making it possible to employ either side.

Reversal of the valve seat 17 is also contemplated. The seat consists of a ring, the inner edges of which are beveled at 18. These beveled edges provide a double valve seat. The valve seat is screwed into the opening 5 against an annular flange or offset 24, holes 19 being provided for the insertion of a suitable spanner wrench. A packing 20 is inserted in the threaded opening before the lateral outlet pipe 11 is screwed in place. The seat 17 is introduced into the valve body b screwing it through the upper opening 4 before inserting the bonnet 8, permitting it to drop down over the opening 5 into which one can reach the seat to screw it in place.

Reference is now made to Figure 1. As stated before, a pair of valves 1 are shown in connection with a pair of tanks 12 and 14. The valve disk 15 of the first valve is raised permitting fluid to flow through the outlet 11 into the tank 12. The fluid also continues flowing in the pipe line 6, 7 on to other tanks that are to be supplied by the pipe line. The valve disk 15 of the second valve (right) is shown closed, and it is to be observed that the valve disk assumes a position substantially level with the bottom of the pipe line so that the pipe line is practically continued through the second valve. The formation of a pocket in which fluid may collect is avoided.

What is meant by the last statement is this: According to practice it is customary to connect the pipe line 6, 7 with the lateral outlet 11 by means of a T. The lateral outlet is then provided with a globe valve somewhere in its length. The resulting space above the globe valve mentioned and the bottom of the pipe line defines a liberal pocket which can contain a considerable quantity of static fluid when the globe valve is closed upon complete filling of the adjacent tank. The omission of the valve in the lateral outlet 11 or 13 obviously avoids the pocket of static fluid. The valve 1 at once serves both the usual duty and as a closure for the lateral outlet.

The ability to reverse both the valve disk 15 and seat 17 obviously adds to the useful life of the valve. Should either of the operative surfaces become worn to such an extent that leakage occurs, it becomes a very simple matter to turn either the disk or the seat over to make the valve ready for satisfactory use.

While the construction and arrangement of the improved valve as herein described is that of a generally preferred form, obviously modifications and changes may be made without departing from the spirit of the invention or the scope of the claim.

I claim:—

A valve comprising a body having a pair of vertically aligning openings and a pair of horizontally aligning openings, a valve seat screwed into one of the vertical openings until it comes substantially flush with the horizontally aligning openings, packing means inserted in said vertical opening following and contacting the valve seat, a pipe screwed into said vertical opening so that the end thereof presses against the packing means to make a joint with the seat, a bonnet occupying the other vertical opening, a valve disk, and means operable in the bonnet carrying the disk and transporting the disk across the body into engagement with said seat.

JOSEPH W. LOFTIN.